(12) United States Patent
Maxim et al.

(10) Patent No.: US 12,526,001 B2
(45) Date of Patent: Jan. 13, 2026

(54) LINEARIZED FRONT-END OPERATION USING INFORMATION FROM BASEBAND CIRCUIT

(71) Applicant: Qorvo US, Inc., Greensboro, NC (US)

(72) Inventors: George Maxim, Saratoga, CA (US); Nadim Khlat, Cugnaux (FR); Baker Scott, San Jose, CA (US); Jackie Johnson, Trinity, NC (US)

(73) Assignee: Qorvo US, Inc., Greensboro, NC (US)

( * ) Notice: Subject to any disclaimer, the term of this patent is extended or adjusted under 35 U.S.C. 154(b) by 0 days.

(21) Appl. No.: 18/728,705

(22) PCT Filed: Jan. 18, 2023

(86) PCT No.: PCT/US2023/060803
§ 371 (c)(1),
(2) Date: Jul. 12, 2024

(87) PCT Pub. No.: WO2023/141443
PCT Pub. Date: Jul. 27, 2023

(65) Prior Publication Data
US 2025/0158643 A1 May 15, 2025

Related U.S. Application Data

(60) Provisional application No. 63/367,251, filed on Jun. 29, 2022, provisional application No. 63/300,463, (Continued)

(51) Int. Cl.
*H04B 1/04* (2006.01)

(52) U.S. Cl.
CPC .............. *H04B 1/04* (2013.01); *H04B 1/0475* (2013.01)

(58) Field of Classification Search
CPC ....... H03F 1/02; H03F 1/32; H03F 3/19; H03F 3/21; H03F 3/195; H04B 1/04;
(Continued)

(56) References Cited

U.S. PATENT DOCUMENTS

| 4,797,898 A | 1/1989 | Martinez |
| 5,793,821 A | 8/1998 | Norrell et al. |

(Continued)

FOREIGN PATENT DOCUMENTS

| BR | 112015001348 A2 | 7/2017 |
| CN | 1151229 A | 6/1997 |

(Continued)

OTHER PUBLICATIONS

International Search Report and Written Opinion for International Patent Application No. PCT/US2022/043600, mailed Jan. 11, 2023, 15 pages.

(Continued)

*Primary Examiner* — Shawkat M Ali
(74) *Attorney, Agent, or Firm* — Withrow & Terranova, P.L.L.C.

(57) ABSTRACT

Systems and methods for front-end linearization using information from a baseband circuit are disclosed. In one aspect, a baseband circuit provides information to a front-end module that uses the information to adjust operating parameter settings such as how an analog predistortion (APD) circuit or power management integrated circuit behaves to provide more linear operation of the front-end module across the frequencies of interest. In exemplary aspects, the front-end module may receive raw information from which the front-end module determines what changes should be made. In alternate exemplary aspects, the baseband circuit provides instructions or coefficients that are then used by the front-end module to make the changes. In either event, the (Continued)

front-end module may optimize operation to reduce power consumption and provide more linear operation so that the transceiver may better operate within the parameters of a given wireless protocol.

30 Claims, 13 Drawing Sheets

Related U.S. Application Data filed on Jan. 18, 2022, provisional application No. 63/300,470, filed on Jan. 18, 2022.

(58) Field of Classification Search
CPC ... H04B 1/38; H04B 1/44; H04B 7/06; H04B 1/0456; H04B 17/10; H04L 25/02; H04L 25/49; H04W 88/02; H04W 88/06
USPC ............... 375/295–297; 455/73, 78, 574
See application file for complete search history.

(56) References Cited

U.S. PATENT DOCUMENTS

| | | | |
|---|---|---|---|
| 6,166,601 A | 12/2000 | Shalom et al. | |
| 6,275,685 B1 | 8/2001 | Wessel et al. | |
| 6,630,862 B1 | 10/2003 | Perthold et al. | |
| 6,760,451 B1 | 7/2004 | Craven et al. | |
| 6,806,767 B2 | 10/2004 | Dow | |
| 6,947,711 B1 | 9/2005 | Leyonhjelm | |
| 7,076,225 B2 | 7/2006 | Li et al. | |
| 7,170,342 B2 | 1/2007 | Suzuki et al. | |
| 7,430,248 B2 | 9/2008 | McCallister | |
| 7,522,658 B2 | 4/2009 | Jensen | |
| 7,583,754 B2 | 9/2009 | Liu | |
| 7,663,436 B2 | 2/2010 | Takano et al. | |
| 7,683,713 B2 | 3/2010 | Hongo | |
| 7,738,593 B2 | 6/2010 | Howard | |
| 7,755,429 B2 | 7/2010 | Nguyen et al. | |
| 7,831,221 B2 | 11/2010 | Leffel et al. | |
| 7,859,338 B2 | 12/2010 | Bajdechi et al. | |
| 7,889,820 B2 | 2/2011 | Murthy et al. | |
| 7,978,009 B2 | 7/2011 | Mu | |
| 8,493,141 B2 | 7/2013 | Khlat et al. | |
| 8,605,819 B2 | 12/2013 | Lozhkin | |
| 8,649,745 B2 | 2/2014 | Bai et al. | |
| 8,749,309 B2 | 6/2014 | Ho et al. | |
| 8,831,544 B2 | 9/2014 | Walker et al. | |
| 8,884,692 B2 | 11/2014 | Lee | |
| 9,001,947 B2 | 4/2015 | Wyville | |
| 9,036,734 B1 | 5/2015 | Mauer et al. | |
| 9,065,504 B2 | 6/2015 | Kwon et al. | |
| 9,112,413 B2 | 8/2015 | Barth et al. | |
| 9,356,760 B2 | 5/2016 | Larsson et al. | |
| 9,438,196 B2 | 9/2016 | Smith et al. | |
| 9,461,596 B1 | 10/2016 | Ozard | |
| 9,560,595 B2 | 1/2017 | Dakshinamurthy et al. | |
| 9,692,366 B2 | 6/2017 | Pilgram | |
| 9,705,477 B2 | 7/2017 | Velazquez | |
| 9,973,370 B1 | 5/2018 | Langer et al. | |
| 10,177,719 B2 | 1/2019 | Gazneli et al. | |
| 10,181,478 B2 | 1/2019 | Scott et al. | |
| 10,305,435 B1 | 5/2019 | Murugesu et al. | |
| 10,326,408 B2 | 6/2019 | Khlat et al. | |
| 10,361,744 B1 | 7/2019 | Khlat | |
| 10,432,145 B2 | 10/2019 | Khlat | |
| 10,476,437 B2 | 11/2019 | Nag et al. | |
| 10,778,345 B2 | 9/2020 | El-Hassan et al. | |
| 11,005,368 B2 | 5/2021 | Bansal et al. | |
| 11,088,660 B2 | 8/2021 | Lin et al. | |
| 11,387,789 B2 | 7/2022 | Khlat et al. | |
| 11,424,719 B2 | 8/2022 | Khlat | |
| 11,483,186 B2 | 10/2022 | Casper et al. | |
| 11,569,783 B2 | 1/2023 | Nomiyama et al. | |
| 11,637,531 B1 | 4/2023 | Perreault et al. | |
| 11,942,899 B2 | 3/2024 | Khlat et al. | |
| 12,057,813 B2 | 8/2024 | Khlat et al. | |
| 2001/0022532 A1 | 9/2001 | Dolman | |
| 2001/0054974 A1 | 12/2001 | Wright | |
| 2002/0190811 A1 | 12/2002 | Sperber | |
| 2003/0042979 A1 | 3/2003 | Gurvich et al. | |
| 2004/0239446 A1 | 12/2004 | Gurvich et al. | |
| 2004/0259509 A1 | 12/2004 | Duello et al. | |
| 2005/0100105 A1 | 5/2005 | Jensen | |
| 2005/0254659 A1 | 11/2005 | Heinsen | |
| 2005/0258898 A1 | 11/2005 | Hongo | |
| 2006/0068710 A1 | 3/2006 | Jensen | |
| 2006/0209981 A1 | 9/2006 | Kluesing et al. | |
| 2006/0217083 A1 | 9/2006 | Braithwaite | |
| 2007/0032208 A1 | 2/2007 | Choi et al. | |
| 2008/0009215 A1 | 1/2008 | Safarian et al. | |
| 2008/0074209 A1 | 3/2008 | Ceylan et al. | |
| 2008/0161073 A1 | 7/2008 | Park et al. | |
| 2008/0246550 A1 | 10/2008 | Biedka et al. | |
| 2009/0004981 A1 | 1/2009 | Eliezer et al. | |
| 2009/0061787 A1 | 3/2009 | Koller et al. | |
| 2009/0074106 A1 | 3/2009 | See et al. | |
| 2009/0125264 A1 | 5/2009 | Betts et al. | |
| 2009/0141828 A1 | 6/2009 | Huang et al. | |
| 2009/0141830 A1 | 6/2009 | Ye | |
| 2009/0232260 A1 | 9/2009 | Hayashi et al. | |
| 2009/0302945 A1 | 12/2009 | Catoiu et al. | |
| 2010/0135439 A1 | 6/2010 | Lackey | |
| 2010/0298030 A1 | 11/2010 | Howard | |
| 2011/0095826 A1 | 4/2011 | Hadjichristos et al. | |
| 2011/0182347 A1 | 7/2011 | Cheung | |
| 2011/0227767 A1 | 9/2011 | O'Brien | |
| 2012/0068748 A1 | 3/2012 | Stojanovic et al. | |
| 2012/0139635 A1 | 6/2012 | Ho et al. | |
| 2012/0189081 A1 | 7/2012 | Omoto et al. | |
| 2012/0244824 A1 | 9/2012 | Entezari et al. | |
| 2012/0256688 A1 | 10/2012 | Onishi | |
| 2013/0141062 A1 | 6/2013 | Khlat | |
| 2013/0214858 A1 | 8/2013 | Tournatory et al. | |
| 2013/0222057 A1 | 8/2013 | Henshaw | |
| 2013/0243129 A1 | 9/2013 | Okuni et al. | |
| 2014/0028368 A1 | 1/2014 | Khlat | |
| 2014/0029683 A1 | 1/2014 | Morris et al. | |
| 2014/0055199 A1 | 2/2014 | Takano et al. | |
| 2014/0062590 A1 | 3/2014 | Khlat et al. | |
| 2014/0062599 A1 | 3/2014 | Xu et al. | |
| 2014/0065989 A1 | 3/2014 | McLaurin | |
| 2014/0072307 A1 | 3/2014 | Zamani et al. | |
| 2014/0084996 A1 | 3/2014 | Schwent et al. | |
| 2014/0105264 A1 | 4/2014 | McLaurin et al. | |
| 2014/0184337 A1 | 7/2014 | Nobbe et al. | |
| 2014/0213196 A1 | 7/2014 | Langer et al. | |
| 2014/0232470 A1 | 8/2014 | Wilson | |
| 2014/0266432 A1 | 9/2014 | Scott et al. | |
| 2014/0315504 A1 | 10/2014 | Sakai et al. | |
| 2014/0361837 A1 | 12/2014 | Strange et al. | |
| 2015/0028946 A1 | 1/2015 | Al-Qaq et al. | |
| 2015/0126142 A1 | 5/2015 | Meredith | |
| 2015/0333781 A1 | 11/2015 | Alon et al. | |
| 2016/0173030 A1 | 6/2016 | Langer et al. | |
| 2016/0174293 A1* | 6/2016 | Mow | H04W 88/06 455/426.1 |
| 2016/0182099 A1 | 6/2016 | Boddupally et al. | |
| 2016/0182100 A1 | 6/2016 | Menkhoff et al. | |
| 2016/0269210 A1 | 9/2016 | Kim et al. | |
| 2016/0301432 A1 | 10/2016 | Shizawa et al. | |
| 2016/0322992 A1 | 11/2016 | Okawa et al. | |
| 2017/0005676 A1 | 1/2017 | Yan et al. | |
| 2017/0104502 A1 | 4/2017 | Pratt | |
| 2017/0149457 A1 | 5/2017 | Mayer et al. | |
| 2017/0170838 A1 | 6/2017 | Pagnanelli | |
| 2017/0230924 A1 | 8/2017 | Wolberg et al. | |
| 2017/0338842 A1 | 11/2017 | Pratt | |
| 2017/0353197 A1 | 12/2017 | Ruffieux et al. | |
| 2018/0034418 A1 | 2/2018 | Blednov | |
| 2018/0175813 A1 | 6/2018 | Scott et al. | |
| 2018/0226923 A1 | 8/2018 | Nagamori | |
| 2018/0248570 A1 | 8/2018 | Camuffo | |
| 2019/0041890 A1 | 2/2019 | Chen et al. | |

(56) References Cited

U.S. PATENT DOCUMENTS

| | | | |
|---|---|---|---|
| 2019/0058530 | A1 | 2/2019 | Rainish et al. |
| 2019/0068234 | A1 | 2/2019 | Khlat et al. |
| 2019/0097671 | A1 | 3/2019 | Dimpflmaier et al. |
| 2019/0238152 | A1 | 8/2019 | Pagnanelli |
| 2019/0245496 | A1 | 8/2019 | Khlat et al. |
| 2019/0296929 | A1 | 9/2019 | Milicevic et al. |
| 2019/0319583 | A1 | 10/2019 | El-Hassan et al. |
| 2019/0356285 | A1 | 11/2019 | Khlat et al. |
| 2020/0106392 | A1 | 4/2020 | Khlat et al. |
| 2020/0119699 | A1 | 4/2020 | Nishihara et al. |
| 2020/0136561 | A1 | 4/2020 | Khlat et al. |
| 2020/0136563 | A1 | 4/2020 | Khlat |
| 2020/0136568 | A1 | 4/2020 | Hosoda et al. |
| 2020/0162030 | A1* | 5/2020 | Drogi .................... H03F 3/245 |
| 2020/0204422 | A1 | 6/2020 | Khlat |
| 2020/0259685 | A1 | 8/2020 | Khlat |
| 2020/0295713 | A1 | 9/2020 | Khlat |
| 2020/0336111 | A1 | 10/2020 | Khlat |
| 2021/0058970 | A1 | 2/2021 | Kwak et al. |
| 2021/0067097 | A1 | 3/2021 | Wang et al. |
| 2021/0099136 | A1 | 4/2021 | Drogi et al. |
| 2021/0143859 | A1 | 5/2021 | Hageraats et al. |
| 2021/0194517 | A1 | 6/2021 | Mirea et al. |
| 2021/0194740 | A1 | 6/2021 | Aldana et al. |
| 2021/0281228 | A1 | 9/2021 | Khlat |
| 2021/0399690 | A1 | 12/2021 | Panseri et al. |
| 2022/0021348 | A1 | 1/2022 | Philpott et al. |
| 2022/0216834 | A1 | 7/2022 | Myoung et al. |
| 2022/0360229 | A1 | 11/2022 | Khlat |
| 2022/0407462 | A1 | 12/2022 | Khlat |
| 2022/0407463 | A1 | 12/2022 | Khlat et al. |
| 2022/0407464 | A1 | 12/2022 | Khlat et al. |
| 2022/0407465 | A1 | 12/2022 | Khlat |
| 2022/0407478 | A1 | 12/2022 | Khlat et al. |
| 2022/0416730 | A1 | 12/2022 | Su et al. |
| 2023/0065760 | A1 | 3/2023 | Hellberg |
| 2023/0079153 | A1 | 3/2023 | Khlat |
| 2023/0080621 | A1 | 3/2023 | Khlat |
| 2023/0080652 | A1 | 3/2023 | Khlat et al. |
| 2023/0081095 | A1 | 3/2023 | Khlat |
| 2023/0082145 | A1 | 3/2023 | Lin et al. |
| 2023/0140184 | A1* | 5/2023 | Zhu .................... H04L 25/49 455/114.3 |
| 2023/0155614 | A1 | 5/2023 | Jelonnek et al. |
| 2023/0238927 | A1 | 7/2023 | Kay et al. |
| 2023/0318537 | A1 | 10/2023 | Scott et al. |
| 2023/0387859 | A1 | 11/2023 | Drogi et al. |
| 2023/0387860 | A1 | 11/2023 | Khlat et al. |
| 2023/0387861 | A1 | 11/2023 | Maxim et al. |
| 2023/0421110 | A1 | 12/2023 | Maxim et al. |
| 2023/0421111 | A1 | 12/2023 | Khlat et al. |
| 2023/0421112 | A1 | 12/2023 | Scott et al. |
| 2023/0421120 | A1 | 12/2023 | Maxim et al. |
| 2024/0372665 | A1 | 11/2024 | Khoryaev et al. |
| 2024/0426954 | A1 | 12/2024 | Guan et al. |

FOREIGN PATENT DOCUMENTS

| | | | |
|---|---|---|---|
| CN | 1326321 | C | 12/2001 |
| CN | 1550064 | A | 11/2004 |
| CN | 1706096 | A | 12/2005 |
| CN | 101036289 | A | 9/2007 |
| CN | 101651459 | A | 2/2010 |
| CN | 105812073 | A | 7/2016 |
| CN | 107483021 | A | 12/2017 |
| CN | 110798155 | A | 2/2020 |
| CN | 110855251 | A | 2/2020 |
| CN | 111064438 | A | 4/2020 |
| CN | 210693998 | U | 6/2020 |
| CN | 112995079 | A | 6/2021 |
| CN | 113055324 | A | 6/2021 |
| CN | 113659938 | A | 11/2021 |
| CN | 113055324 | B | 12/2021 |
| CN | 116015223 | A | 4/2023 |
| CN | 113659938 | B | 5/2023 |
| CN | 116794580 | A | 9/2023 |
| CN | 117134711 | A | 11/2023 |
| CN | 118117977 | A | 5/2024 |
| CN | 118648236 | A | 9/2024 |
| CN | 118872201 | A | 10/2024 |
| CN | 118117977 | B | 11/2024 |
| CN | 119072847 | A | 12/2024 |
| CN | 119096468 | A | 12/2024 |
| EP | 2705604 | A2 | 3/2014 |
| EP | 2582041 | B1 | 4/2018 |
| EP | 2232713 | B1 | 10/2018 |
| EP | 3416340 | A1 | 12/2018 |
| JP | 2011211533 | A | 10/2011 |
| JP | 2015099972 | A | 5/2015 |
| KR | 20110105319 | A | 9/2011 |
| WO | 2007092794 | A2 | 8/2007 |
| WO | 2010011551 | A2 | 1/2010 |
| WO | 2010135711 | A1 | 11/2010 |
| WO | 2012151594 | A2 | 11/2012 |
| WO | 2014026178 | A1 | 2/2014 |
| WO | 2021042088 | A2 | 3/2021 |
| WO | 2023147211 | A1 | 8/2023 |
| WO | 2023150539 | A1 | 8/2023 |
| WO | 2023150545 | A1 | 8/2023 |
| WO | 2023150587 | A1 | 8/2023 |

OTHER PUBLICATIONS

Non-Final Office Action for U.S. Appl. No. 17/942,472, mailed Feb. 16, 2023, 13 pages.

Extended European Search Report for European Patent Application No. 22195382.1, mailed Feb. 1, 2023, 26 pages.

Extended European Search Report for European Patent Application No. 22195683.2, mailed Feb. 10, 2023, 12 pages.

Non-Final Office Action for U.S. Appl. No. 17/700,700, mailed Apr. 13, 2023, 11 pages.

Bai, W.-D. et al., "Principle of Vector Synthesis Predistortion Linearizers Controlling AM/AM and AM/PM Independently," 2016 IEEE International Conference on Ubiquitous Wireless Broadband (ICUWB), Oct. 16-19, 2016, Nanjing, China, IEEE, 3 pages.

Extended European Search Report for European Patent Application No. 22195695.6, mailed Feb. 14, 2023, 12 pages.

Extended European Search Report for European Patent Application No. 22196188.1, mailed Feb. 2, 2023, 25 pages.

International Search Report and Written Opinion for International Patent Application No. PCT/US2023/060303, mailed Apr. 11, 2023, 12 pages.

Final Office Action for U.S. Appl. No. 17/942,472, mailed Jul. 19, 2023, 16 pages.

Cho, M., "Analog Predistortion for Improvement of RF Power Amplifier Efficiency and Linearity," A Dissertation presented to the Academic Faculty in partial fulfillment of the requirements for the degree Doctor of Philosophy in the School of Electrical and Computer Engineering, Georgia Institute of Technology, Aug. 2016, available from the Internet: [URL: https://repository.gatech.edu/server/api/core/bitstreams/b8fe5cbb-e5db-4efe-b9a2-eaad5f671f14/content], 113 pages.

Kwak, T.-W. et al., "A 2W CMOS Hybrid Switching Amplitude Modulator for EDGE Polar Transmitters," IEEE Journal of Solid-State Circuits, vol. 42, No. 12, Dec. 2007, IEEE, pp. 2666-2676.

Paek, J.-S. et al., "A -137 dBm/Hz Noise, 82% Efficiency AC-Coupled Hybrid Supply Modulator With Integrated Buck-Boost Converter," IEEE Journal of Solid-State Circuits, vol. 51, No. 11, Nov. 2016, IEEE pp. 2757-2768.

Paek, J.-S. et al., "Design of Boosted Supply Modulator With Reverse Current Protection for Wide Battery Range in Envelope Tracking Operation," IEEE Transactions on Microwave Theory and Techniques, vol. 67, No. 1, Jan. 2019, pp. 183-194.

Williams, P., "Crossover Filter Shape Comparisons," White Paper, Linea Research, Jul. 2013, 13 pages.

Non-Final Office Action for U.S. Appl. No. 17/700,685, mailed Dec. 22, 2023, 24 pages.

(56) References Cited

OTHER PUBLICATIONS

Non-Final Office Action for U.S. Appl. No. 17/689,232, mailed Dec. 11, 2023, 27 pages.
Non-Final Office Action for U.S. Appl. No. 17/737,300, mailed Aug. 28, 2023, 14 pages.
Notice of Allowance and Examiner-Initiated Interview Summary for U.S. Appl. No. 17/737,300, mailed Dec. 19, 2023, 12 pages.
Corrected Notice of Allowability for U.S. Appl. No. 17/737,300, mailed Dec. 27, 2023, 8 pages.
Advisory Action for U.S. Appl. No. 17/942,472, mailed Sep. 15, 2023, 3 pages.
Notice of Allowance for U.S. Appl. No. 17/942,472, mailed Oct. 18, 2023, 10 pages.
Corrected Notice of Allowability for U.S. Appl. No. 17/942,472, mailed Nov. 17, 2023, 6 pages.
Notice of Allowance for U.S. Appl. No. 17/700,700, mailed Oct. 23, 2023, 9 pages.
Supplemental Notice of Allowability for U.S. Appl. No. 17/700,700, mailed Nov. 8, 2023, 5 pages.
Non-Final Office Action for U.S. Appl. No. 17/939,350, mailed Jan. 17, 2024, 11 pages.
Extended European Search Report for European Patent Application No. 23153108.8, mailed Jun. 20, 2023, 18 pages.
Extended European Search Report for European Patent Application No. 23174010.1, mailed Oct. 10, 2023, 10 pages.
International Search Report and Written Opinion for International Patent Application No. PCT/US2023/019267, mailed Aug. 3, 2023, 14 pages.
Notice of Allowance and Examiner-Initiated Interview Summary for U.S. Appl. No. 17/700,826, mailed Sep. 11, 2024, 10 pages.
International Search Report and Written Opinion for International Patent Application No. PCT/US2023/061734, mailed May 30, 2023, 15 pages.
International Search Report and Written Opinion for International Patent Application No. PCT/US2023/061741, mailed Jun. 1, 2023, 14 pages.
Invitation to Pay Additional Fees and Partial International Search for International Patent Application No. PCT/US2023/061804, mailed May 26, 2023, 10 pages.
International Search Report and Written Opinion for International Patent Application No. PCT/US2023/061804, mailed Jul. 17, 2023, 20 pages.
Notice of Allowance for U.S. Appl. No. 17/700,685, mailed Apr. 5, 2024, 7 pages.
Final Office Action for U.S. Appl. No. 17/689,232, mailed Mar. 26, 2024, 28 pages.
Advisory Action U.S. Appl. No. 17/689,232, mailed May 23, 2024, 3 pages.
Non-Final Office Action for U.S. Appl. No. 17/689,232, mailed Jul. 17, 2024, 22 pages.
Notice of Allowance for U.S. Appl. No. 17/714,244, mailed Sep. 16, 2024, 8 pages.
Supplemental Notice of Allowability for U.S. Appl. No. 17/700,700, mailed Feb. 28, 2024, 5 pages.
Final Office Action for U.S. Appl. No. 17/939,350, mailed May 21, 2024, 11 pages.
Non-Final Office Action for U.S. Appl. No. 17/939,350, mailed Sep. 6, 2024, 8 pages.
Non-Final Office Action for U.S. Appl. No. 17/700,826, mailed May 15, 2024, 28 pages.
International Search Report and Written Opinion for International Patent Application No. PCT/US2023/025512, mailed Sep. 28, 2023, 13 pages.
Fu, J.-S. et al., "Improving Power Amplifier Efficiency and Linearity Using a Dynamically Controlled Tunable Matching Network," IEEE Transactions on Microwave Theory and Techniques, vol. 56, No. 12, Dec. 2008, pp. 3239-3244.
Kim, S. et al., "A Tunable Power Amplifier Employing Digitally Controlled Accumulation-mode Varactor Array for 2.4-GHz Short-range Wireless Communication," 2016 IEEE Asia Pacific Conference on Circuits and Systems (APCCAS), Oct. 25-28, 2016, Jeju, Korea (South), IEEE, pp. 269-272.
Wang, T.-P., "A Fully Integrated W-Band Push-Push Cmos Vco With Low Phase Noise and Wide Tuning Range," IEEE Transactions on Ultrasonics, Ferroelectrics, and Frequency Control, vol. 58, No. 7, Jul. 2011, IEEE, pp. 1307-1319.
Wanner, R. et al., "Monolithically Integrated SiGe Push-Push Oscillators in the Frequency Range 50-190 GHZ," 2006 IEEE Ninth International Symposium on Spread Spectrum Techniques and Applications, Aug. 28-31, 2006, Manaus, Brazil, IEEE, pp. 26-30.
Notice of Allowance for U.S. Appl. No. 17/689,232, mailed Oct. 21, 2024, 10 pages.
Non-Final Office Action for U.S. Appl. No. 17/890,538, mailed Oct. 21, 2024, 13 pages.
Hammi et al., "Temperature Compensated Digital Predistorter for 3G Power Amplifiers," Electronics, Circuit and Systems, 2005, Dec. 11, 2005, pp. 1-4.
Hao et al., "Hybrid Analog/Digital Linearization Based on Dual-Domain Decomposition of Nonlinearity," 2019 IEEE Asia-Pacific Microwave Conference, Dec. 10, 2019, pp. 156-158.
Lee et al., "Fully Automated Adaptive Analog Predistortion Power Amplifier in WCDMA Applications," 2005 European Microwave Conference CNIT La Defense, Paris, France, vol. 2, Oct. 4, 2005, pp. 967-970.
Li et al., "Analog Predistorter Averaged Digital Predistortion for Power Amplifiers in Hybrid Beam-Forming Multi-Input Multi-Output Transmitter," IEEE Access, vol. 8, Aug. 1, 2020, pp. 146145-146153.
Tome et al., "Hybrid Analog/Digital Linearizatio nof GaN HEMT-Based Power Amplifiers," IEEE Transactions on Microwave Theory and Techniques, vol. 67, No. 1, Jan. 1, 2019, pp. 288-294.
International Search Report and Written Opinion for PCT/US2023/060803, mailed May 19, 2023, 13 pages.
International Search Report and Written Opinion for PCT/US2023/060804, mailed May 4, 2023, 19 pages.

\* cited by examiner

LINEARIZED FRONT-END OPERATION USING INFORMATION FROM BASEBAND CIRCUIT

PRIORITY APPLICATIONS

The present application is a 35 USC 371 national phase filing of International Application No. PCT/US2023/060803, filed Jan. 18, 2023, which claims priority to U.S. Provisional Patent Application Ser. No. 63/300,463, filed on Jan. 18, 2022 and entitled "BASEBAND DIGITALLY ASSISTED APD LINEARIZATION AND PMIC VCC USING MODULATION SIGNAL TYPE, BANDWIDTH, PAR, MPR INFORMATION," the contents of both are incorporated herein by reference in their entireties.

PCT/US2023/060803 also claims priority to U.S. Provisional Patent Application Ser. No. 63/300,470, filed on Jan. 18, 2022 and entitled "BASEBAND DIGITALLY ASSISTED APD LINEARIZATION AND PMIC VCC USING CHANNEL SUB-BANDING AND ADAPTIVE COEFFICIENTS SET SELECTION," the contents of which is incorporated herein by reference in its entirety.

PCT/US2023/060803 also claims priority to U.S. Provisional Patent Application Ser. No. 63/367,251, filed on Jun. 29, 2022 and entitled "LINEARIZED FRONT-END OPERATION USING INFORMATION FROM BASEBAND CIRCUIT," the contents of which is incorporated herein by reference in its entirety.

BACKGROUND

I. Field of the Disclosure

The technology of the disclosure relates generally to assisting a front-end transceiver circuit achieve better linearization across transmit and receive frequencies of interest.

II. Background

Computing devices abound in modern society, and more particularly, mobile communication devices have become increasingly common. The prevalence of these mobile communication devices is driven in part by the many functions that are now enabled on such devices. Increased processing capabilities in such devices means that mobile communication devices have evolved from pure communication tools into sophisticated mobile entertainment centers, thus enabling enhanced user experiences. With the advent of the myriad functions available to such devices, there has been increased pressure to find ways to increase bandwidth available to transmit and receive data. This pressure has resulted in the evolution of the cellular standards to higher frequencies with more particular power level requirements. Meeting these changing standards without unnecessary power use or circuit expense provides room for innovation.

SUMMARY

Aspects disclosed in the detailed description include systems and methods for front-end linearization using information from a baseband circuit. In particular, a baseband circuit provides information to a front-end module that uses the information to adjust operating parameter settings such as how an analog predistortion (APD) circuit or power management integrated circuit behaves to provide more linear operation of the front-end module across the frequencies of interest. The information may include, for example, modulation signal type, bandwidth, peak to average ratio (PAR), maximum power reduction (MPR), and/or sub-band information. In exemplary aspects, the front-end module may receive raw information from which the front-end module determines what changes should be made. In alternate exemplary aspects, the baseband circuit provides instructions such as an index pointer or coefficients that are then used by the front-end module to make the changes. In either event, the front-end module may optimize operation to reduce power consumption and provide more linear operation so that the transceiver may better operate within the parameters of a given wireless protocol.

In this regard, in one aspect, a front-end module for use in a transceiver system is disclosed. The front-end module comprises a bus interface configured to be coupled to a baseband circuit through a communication bus. The front-end module also comprises at least one register configured to store operating parameter settings based on information from the baseband circuit. The front-end module also comprises an operating element that acts on a signal to be transmitted. The front-end module also comprises a control circuit that adjusts the operating element based on the operating parameter settings in the at least one register.

In another aspect, a transceiver system is disclosed. The transceiver system comprises a baseband circuit. The transceiver system also comprises a communication bus coupled to the baseband circuit. The transceiver system also comprises a front-end module. The front-end module comprises a bus interface coupled to the communication bus. The front-end module also comprises at least one register configured to store operating parameter settings based on information from the baseband circuit. The front-end module also comprises an operating element that acts on a signal to be transmitted. The front-end module also comprises a control circuit that adjusts the operating element based on the operating parameter settings in the at least one register.

DETAILED DESCRIPTION

Figure 1:
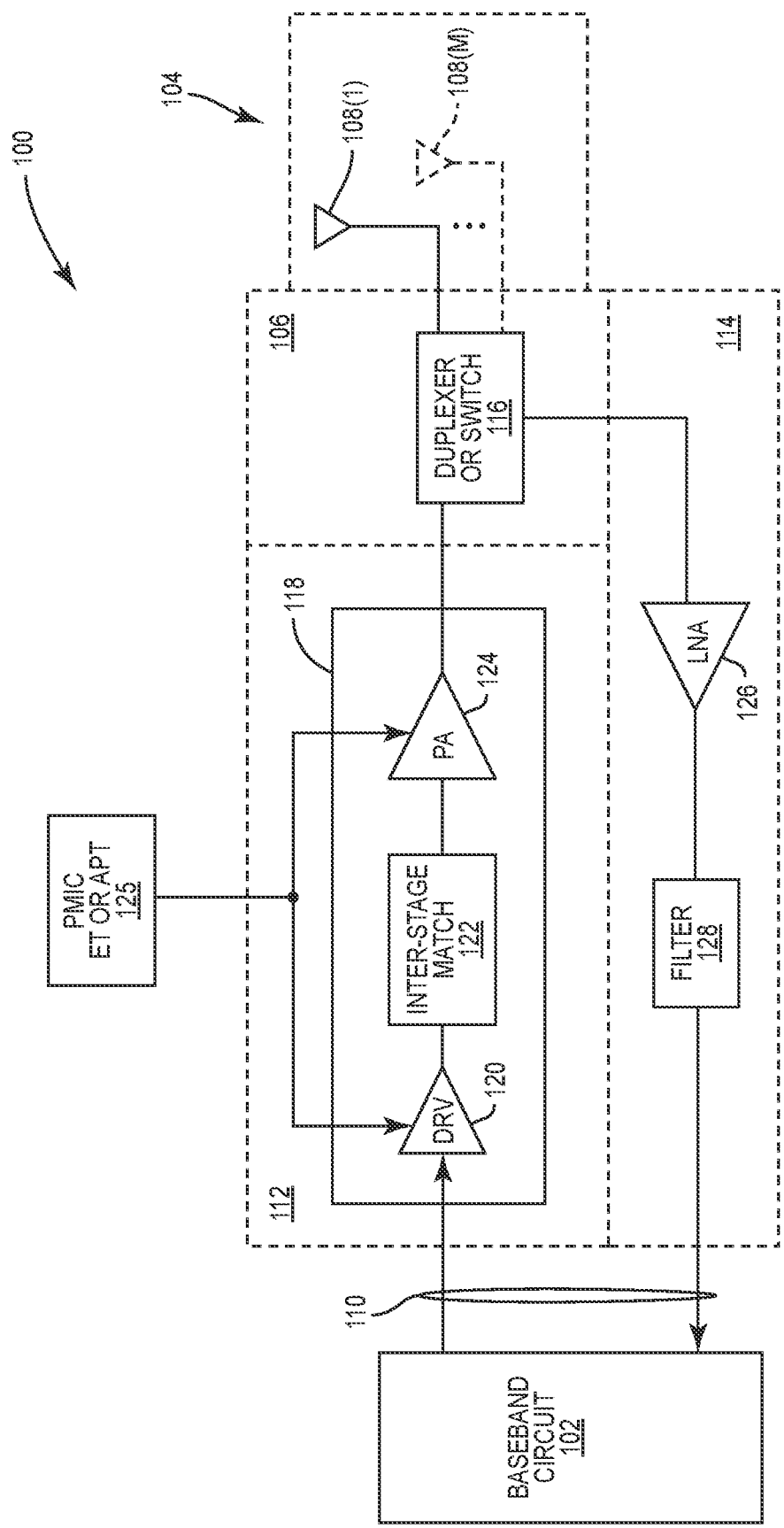
FIG. 1 is a block diagram of a transceiver with a baseband circuit coupled to an antenna module through a front-end module.

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element such as a layer, region, or substrate is referred to as being "on" or extending "onto" another element, it can be directly on or extend directly onto the other element or intervening elements may also be present. In contrast, when an element is referred to as being "directly on" or extending "directly onto" another element, there are no intervening elements present. Likewise, it will be understood that when an element such as a layer, region, or substrate is referred to as being "over" or extending "over" another element, it can be directly over or extend directly over the other element or intervening elements may also be present. In contrast, when an element is referred to as being "directly over" or extending "directly over" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Relative terms such as "below" or "above" or "upper" or "lower" or "horizontal" or "vertical" may be used herein to describe a relationship of one element, layer, or region to another element, layer, or region as illustrated in the Figures. It will be understood that these terms and those discussed above are intended to encompass different orientations of the device in addition to the orientation depicted in the Figures.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Aspects disclosed in the detailed description include systems and methods for front-end linearization using information from a baseband circuit. In particular, a baseband circuit provides information to a front-end module that uses the information to adjust operating parameter settings such as how an analog predistortion (APD) circuit or power management integrated circuit behaves to provide more linear operation of the front-end module across the frequencies of interest. The information may include, for example, modulation signal type, bandwidth, peak to average ratio (PAR), maximum power reduction (MPR), and/or sub-band information. In exemplary aspects, the front-end module may receive raw information from which the front-end module determines what changes should be made. In alternate exemplary aspects, the baseband circuit provides instructions or coefficients that are then used by the front-end module to make the changes. In either event, the front-end module may optimize operation to reduce power consumption and provide more linear operation so that the transceiver may better operate within the parameters of a given wireless protocol.

Before addressing particular aspects of the present disclosure, a brief overview of a transceiver having a baseband circuit coupled to an antenna module through a front-end module is provided in FIG. 1 to assist in explaining possible areas for improvement in such systems. A discussion of exemplary aspects of the present disclosure begins below with reference to FIG. 2.

In this regard, FIG. 1 is a block diagram of a transceiver system 100 having a baseband circuit 102 coupled to an antenna module 104 through a front-end module 106. The baseband circuit 102 may determine (or be instructed by a remote source) specific channel information including, but not limited to, channel modulation type (e.g., quadrature phase shift key (QPSK), quadrature amplitude modulation (QAM including QAM variations such as QAM64, QAM256), or the like), cellular protocol (e.g., 2G, 3G, 4G, 5G, or the like), peak to average ratio (PAR), maximum power reduction (MPR), channel information, sub-band information, bandwidth, and the like. The antenna module 104 may include multiple antennas 108(1)-108(M) or just one antenna 108. The antenna module 104 uses the antennas 108(1)-108(M) to send and receive electromagnetic signals as is well understood. Where more than one antenna 108(1)-108(M) is present, they may be used for diversity reception and transmission, beam steering, or the like, again as is well understood.

The baseband circuit 102 may communicate with the front-end module 106 through a radio frequency front-end (RFFE) bus 110 using an RFFE signaling protocol such as the RFFE v. 3.0, protocol published in April 2020 by MIPI and available to MIPI members. Other protocols may be used, including older or future versions of RFFE as well as other two-wire or multi-wire protocols.

The front-end module 106 may include both a transmission chain 112 and a reception or receive chain 114. A duplexer or switch 116 couples to the transmission chain 112 and the receive chain 114 and selectively couples the antenna module 104 to one of the chains for transmission or reception as needed.

The transmission chain 112 may include a power amplifier module 118 that includes a driver amplifier stage 120, an interstage matching circuit 122, and a primary power amplifier stage 124. Additional amplifier stages may be present although they are not shown. Likewise, the amplifier stages 120, 124 may include a plurality of amplifying transistors and may be arranged as single ended, differentially ended, quadrature, Doherty, Barely Doherty, or the like as is well understood. A power management integrated circuit (PMIC) 125 which may include envelope tracking (ET) or average power tracking (APT) circuitry may be associated with the power amplifier module 118 and may provide control signals that change the operation of the power amplifier module 118. In use, a signal to be transmitted is provided from the baseband circuit 102 to the front-end module 106, where the power amplifier module 118 boosts the signal to a desired power level and provides the boosted signal to the antenna module 104 through the switch 116.

Similarly, incoming signals impinge on the antenna module 104 and are provided to the reception chain 114 from the switch 116. Such signals are boosted by a low noise amplifier (LNA) stage 126 and may be filtered by a filter stage 128 before being passed to the baseband circuit 102 through the RFFE bus 110.

Permutations of the architecture of the transceiver system 100 have occurred through the evolution of multiple wireless communication standards. A common theme of such permutations is that linear operation of elements within the transceiver system 100 makes it easier to comply with requirements of the relevant cellular standards. In the early days where the frequencies were relatively low and the signal bandwidths were relatively small, the ability to provide linear operation was relatively easy. As the frequencies and signal bandwidths increased, the architecture of the transceivers became more complicated (e.g., the inclusion of the PMIC 125 with associated APT or ET) to assist in keeping the elements operating in a linear fashion.

The linearity of the power amplifier stages 120, 124 within the power amplifier module 118 are strongly dependent on the modulation type used by the baseband circuit 102. Likewise, the modulation bandwidth affects the linearity of the power amplifier stages 120, 124. Modern 5G modulations result in larger PAR. To keep the power amplifier stages 120, 124 in linear operation, the size of the power amplifier stages 120, 124 is generally increased and then operated below the maximum power levels (i.e., "backed off,"). This over-design of the power amplifier stages 120, 124 results in sub-performance and particularly impacts efficiency.

The power back off is given by the modulation power reduction (MPR) value. The higher the back off, the lower the efficiency of the power amplifier module 118. Conventional systems such as the transceiver system 100 operate such that the baseband circuit 102 passes only basic information to the front-end module 106 such as operating band and the power mode, but does not pass information such as modulation type, bandwidth, MPR, channel, sub-band, or PAR. Some modulation types can tolerate larger distortion at the peak of the signal, however, this modulation type information is not provided to the front-end module 106. Accordingly, the front-end module 106 may assume a worst case and performance may be suboptimal.

Exemplary aspects of the present disclosure allow a transceiver system to optimize power use while maintaining linearity over the regions of interest by communicating information from the baseband circuit to the front-end module (or power management circuit) that allows the front-end module (or power management circuit) to adjust operating parameter settings (e.g., bias on power amplifier stages, changes to interstage matching, or load modulation) based on the information. There are a variety of ways and formats this information may be gleaned and passed to the front-end module. Initially, the channel and modulation information may be translated into sub-banding information, PAR information, MPR information, channel bandwidth, and the like as initially explained with reference to FIG. 2. This translation may be done in a variety of locations as explained with reference to FIGS. 3A-3C. Then format of the information passed between the baseband circuit and the front-end module may vary to be the translated information or a pointer to information at the front-end module that corresponds to an entry in memory that provides the translated information from a look-up table or the like as illustrated in FIGS. 4A-4C. Further details are provided subsequently.

Figure 2:
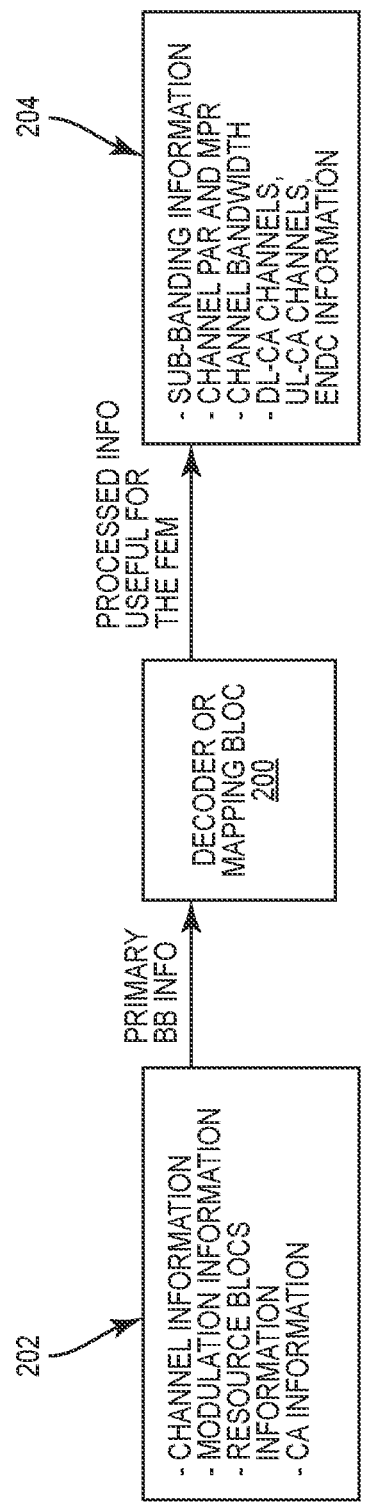
FIG. 2 is a schematic diagram of a decoder that uses baseband information to provide processed information that may be used by the front-end module or a power management module.

In this regard, FIG. 2 illustrates a decoder 200 that takes primary baseband information 202 (hereinafter "primary information"), which may include, for example, channel information, modulation type information, resource blocks information, and/or carrier aggregation (CA) information and decodes or maps the primary information 202 into processed information 204, which may include, but is not limited to: sub-banding information, channel PAR information, channel MPR information, channel bandwidth, download (DL) or upload (UL) CA channels, antenna information, and/or Evolved Universal Mobile Telecommunications Service (UMTS) Terrestrial Radio Access Network (E-UTRAN) New radio-Dual Connectivity (ENDC) information.

Some form of this processed information 204 is then provided to a front-end module. The front-end module may use the processed information 204 to adjust operating parameter settings of the elements within the front-end module to provide linear operation, which would improve efficiency and improve the user experience.

Figure 3A:
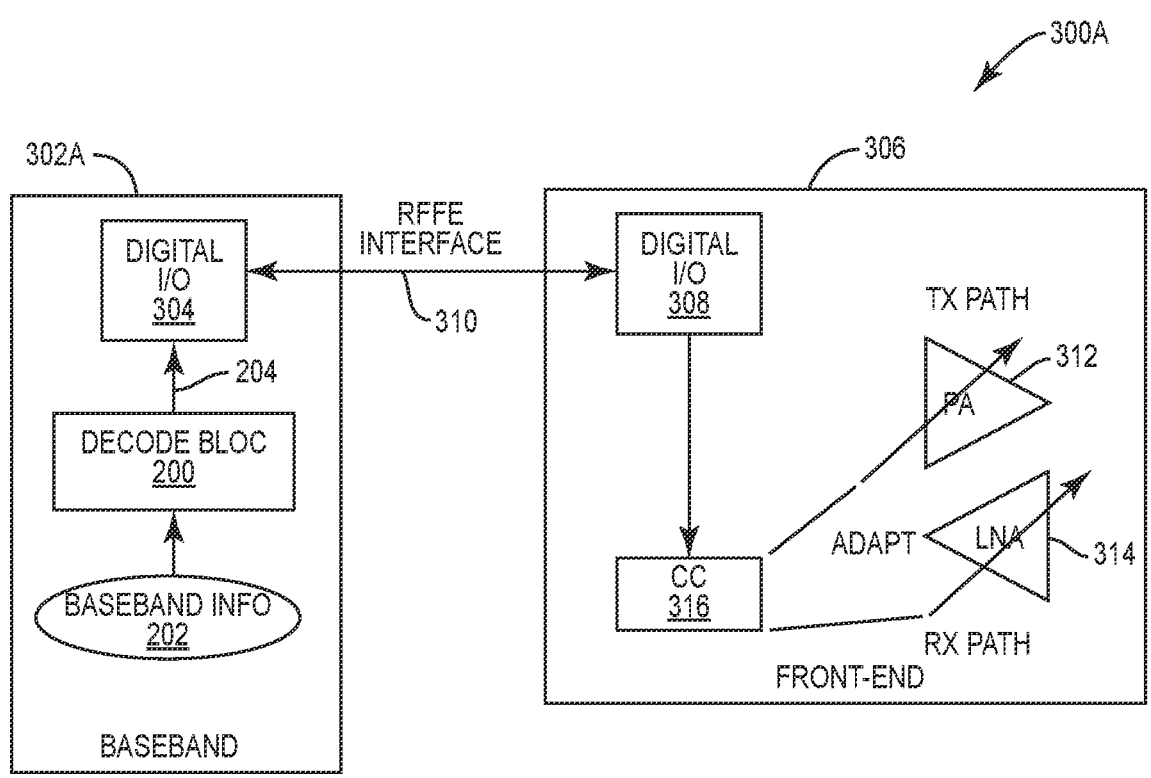
FIG. 3A is a block diagram illustrating that the decoder of FIG. 2 may be in the baseband circuit.
Figure 3B:
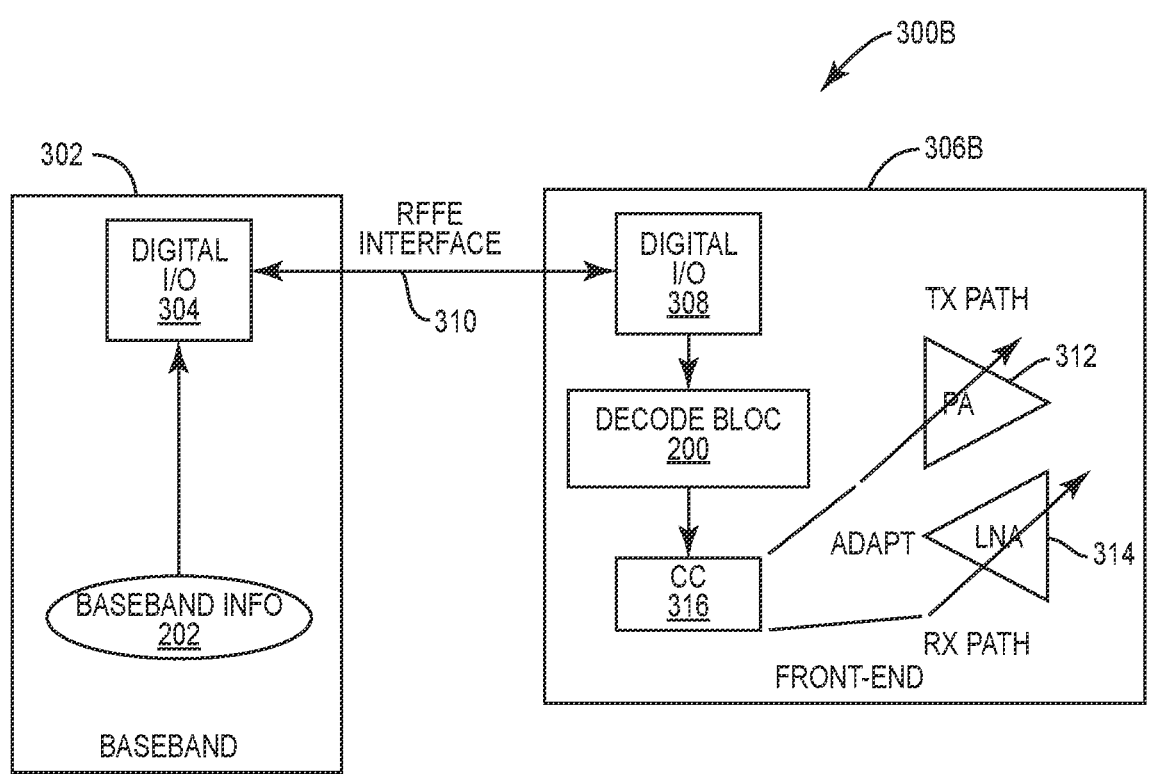
FIG. 3B is a block diagram illustrating that the decoder of FIG. 2 may be in the front-end module.
Figure 3C:
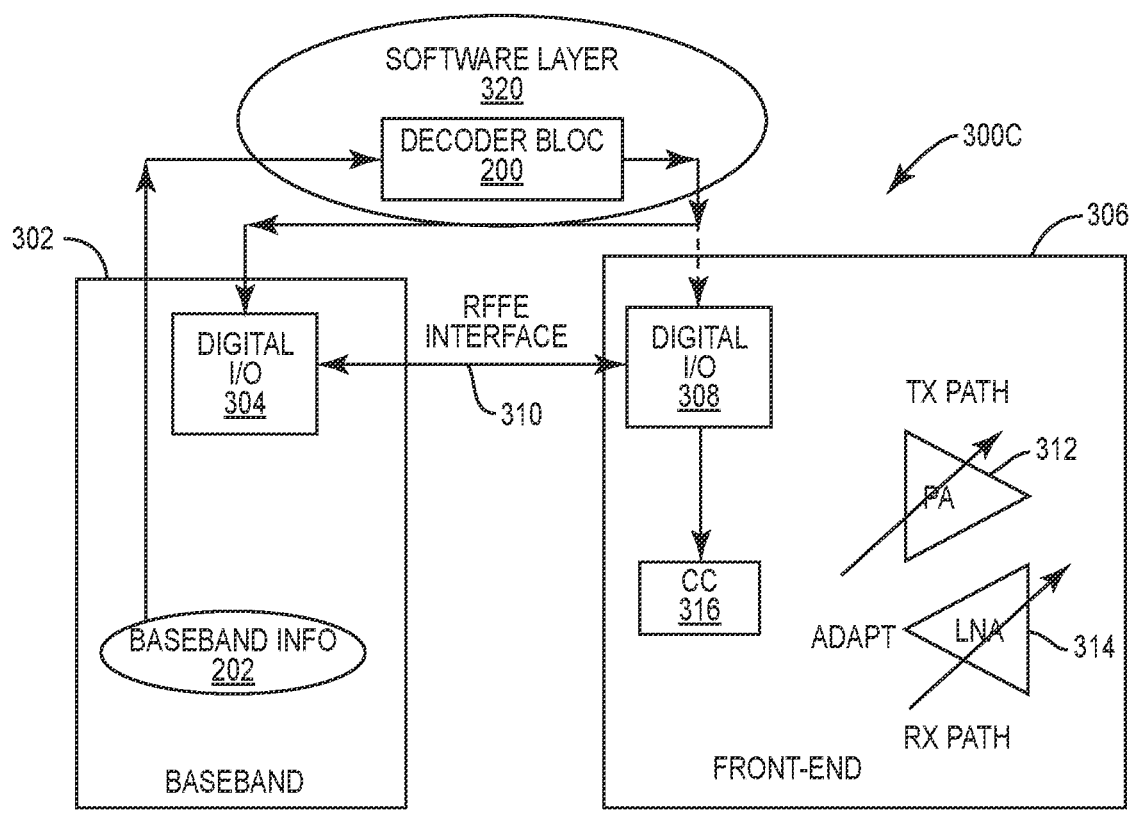
FIG. 3C is a block diagram illustrating that the decoder of FIG. 2 may be outside the baseband circuit and the front-end module, but provide the decoded information to either.
Figure 4A:
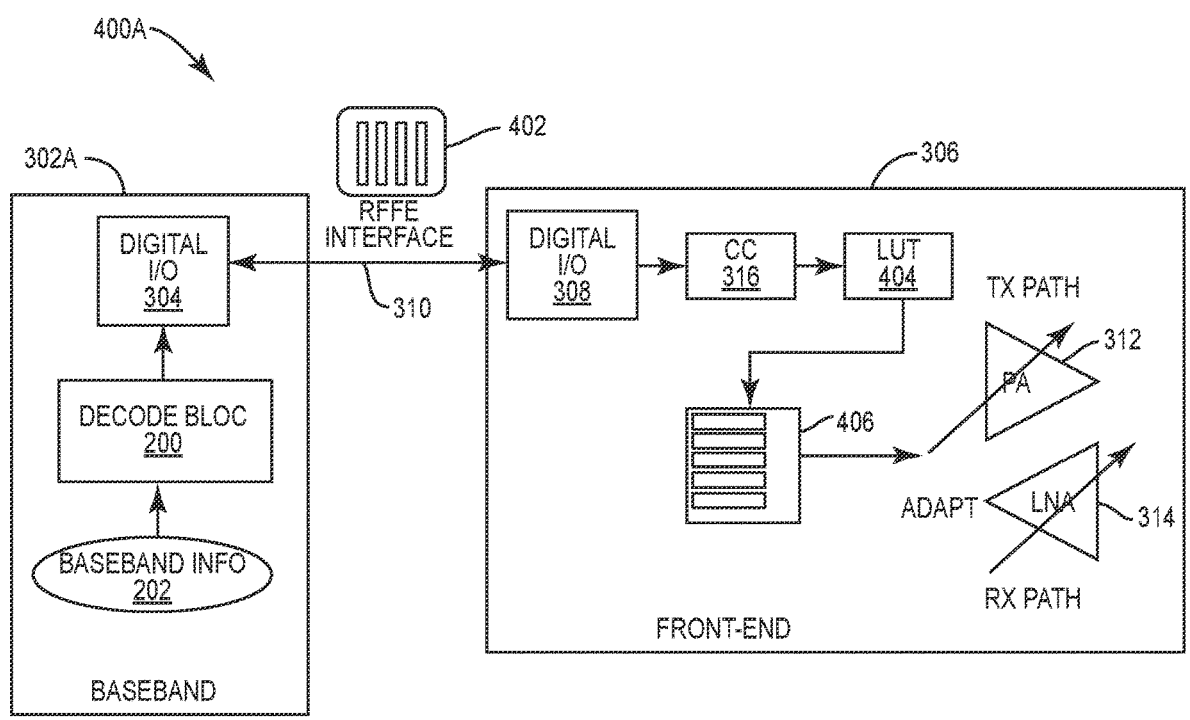
FIG. 4A is a block diagram illustrating how the circuit of FIG. 3A may send the decoded information to the front-end module.
Figure 4B:
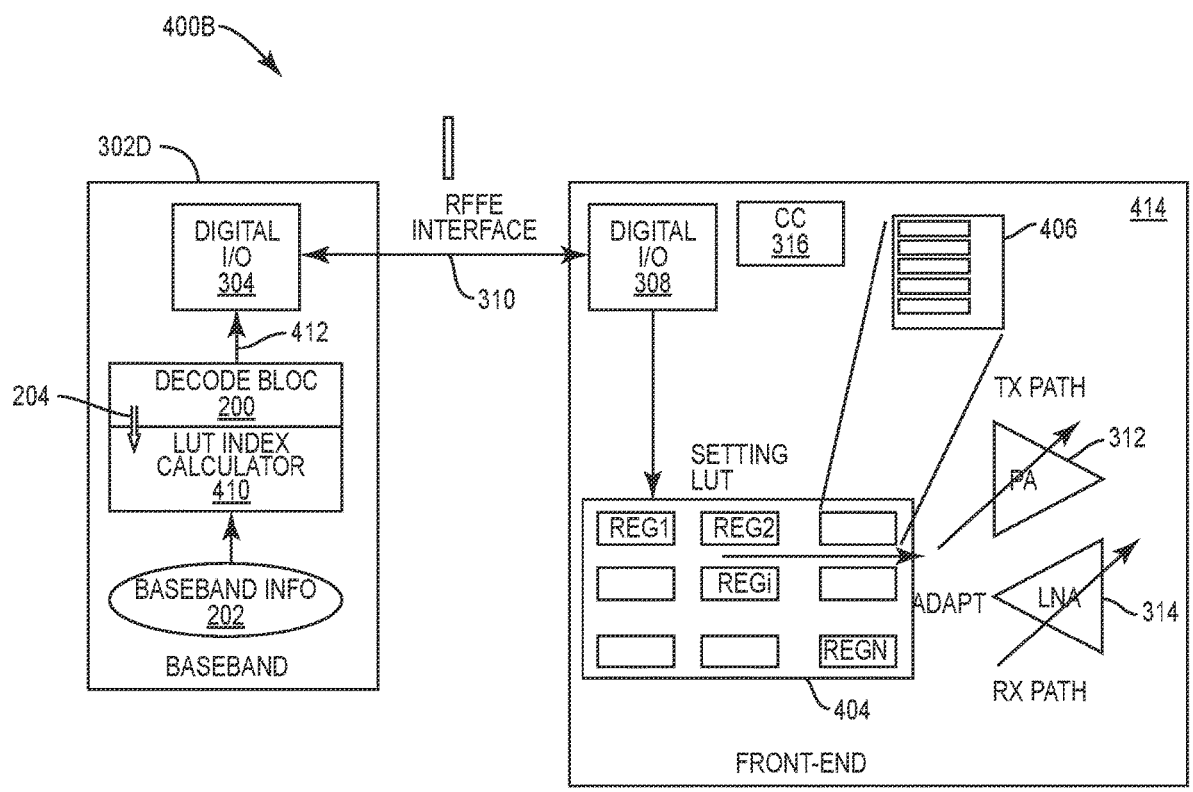
FIG. 4B is a block diagram illustrating how the circuit of FIG. 3A may send a look-up table index to the front-end module.
Figure 4C:
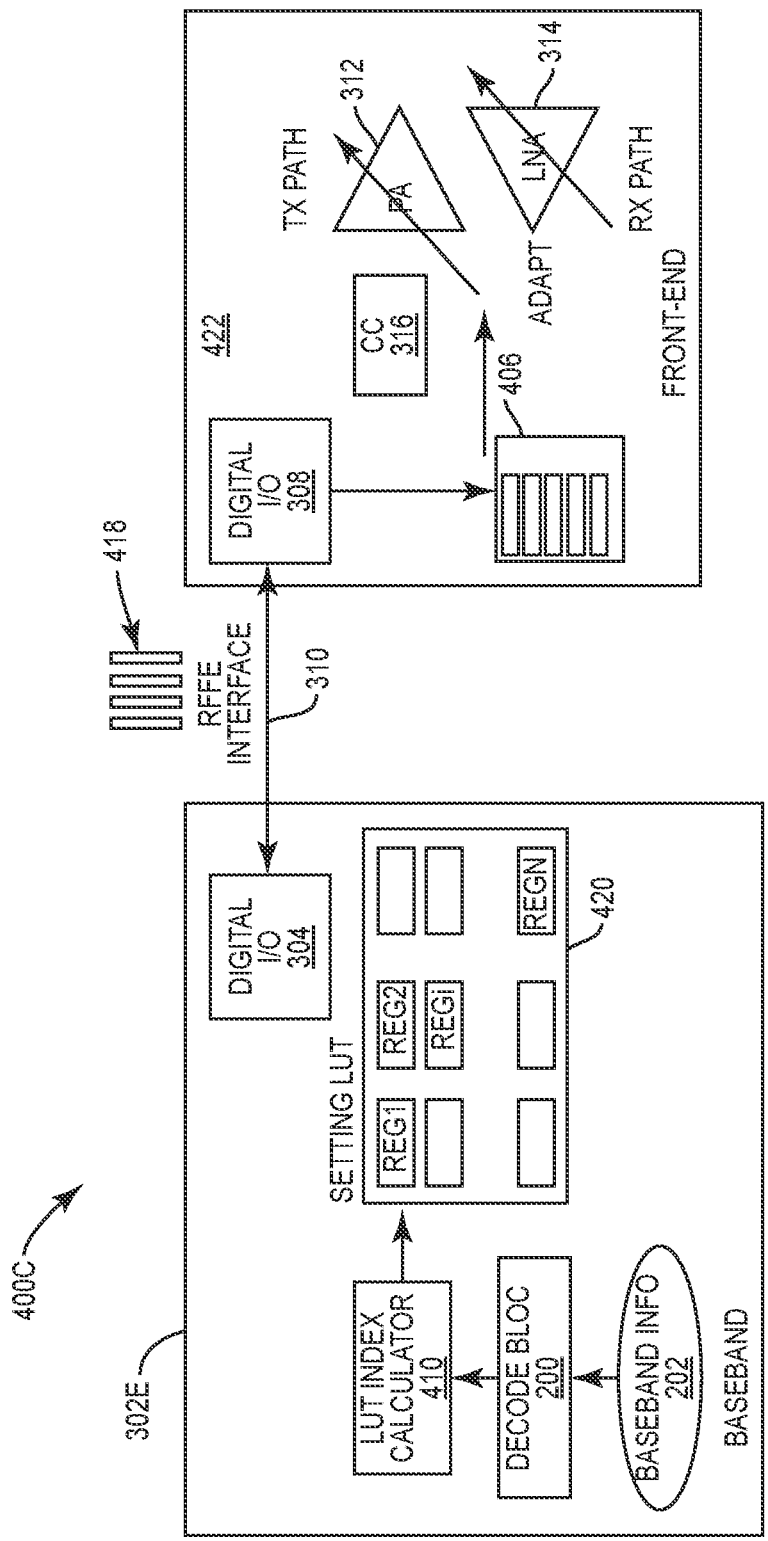
FIG. 4C is a block diagram illustrating how the circuit of FIG. 3A may send register information to the front-end module.

As noted above, the decoder 200 may be provided in a variety of locations as better seen in FIGS. 3A-3C. In this regard, FIG. 3A illustrates a transceiver system 300A that includes a baseband circuit 302A with a decoder 200 (also referred to as DECODE BLOC in the Figures) therein. The primary information 202 is provided to the decoder 200 and the processed information 204 is sent to a digital input/output (I/O) bus interface 304. The processed information 204 is then provided to a front-end module 306 through a bus 310. In an exemplary aspect, this bus 310 may be an RFFE bus or it can be a sideband bus. The front-end module 306 includes a bus interface 308, which may be a digital I/O interface, as well as a transmission chain 312 and a receive chain 314. The front-end module 306 may include a control circuit 316 which modifies the operating parameter settings of the transmission chain 312 and/or the receive chain 314 based on the received processed information 204.

In contrast, a transceiver system 300B, illustrated in FIG. 3B moves the decoder 200 into a front-end module 306B. A baseband circuit 302 sends the primary information 202 to the front-end module 306B through the bus interface 304 and bus 310. The front-end module 306B receives the primary information 202 and decodes it with the decoder 200. The control circuit 316 modifies the transmission chain 312 and the receive chain 314 based on the processed information 204.

As still another option, the decoder 200 may be implemented in software as shown by FIG. 3C. Specifically, a transceiver system 300C may include the baseband circuit 302 and the front-end module 306 coupled by the bus 310. The baseband circuit 302 provides the primary information 202 to the decoder 200 in a hosted software layer 320, which may be in an application processor (not shown) or the like. The hosted software layer 320 may pass the processed information 204 back to the baseband circuit 302 or directly to the front-end module 306. In the former case, the baseband circuit 302 may send the processed information 204 to the front-end module 306 through the bus interface 304 and bus 310. In the latter case, the control circuit 316 may receive the processed information 204 directly from the software layer 320. In either event, the control circuit 316 may adjust the transmission chain 312 and/or the receive chain 314 based on the processed information 204. Using such a software layer 320 may provide some additional flexibility in that unlike updating hardware, updating software may be done more readily. Likewise, use of the software layer 320 may reduce the burden on the baseband circuit 302 and the front-end module 306.

In addition to the location of the decoder 200, there may be variations in the format through which the information (primary information 202 or processed information 204) is provided across the bus 310 as illustrated by FIGS. 4A-4C. While some specific examples are provided, it should be appreciated that other variations of how the information is provided may be used without departing from the present disclosure.

In this regard, FIG. 4A illustrates transceiver system 400A, which is a variation of the transceiver system 300A, where the baseband circuit 302A provides the processed information 204 to the front-end module 306 as a signal 402. The control circuit 316 receives the processed information 204 and uses a look-up table (LUT) 404 to determine parameter settings that are then written into a register(s) 406. The control circuit 316 uses the setting information in the register(s) 406 to make changes to elements within the transmission chain 312 and the receive chain 314. Since the signal 402 has the processed information 204, the signal 402 may be relatively long.

In contrast, the transceiver system 400B illustrated in FIG. 4B provides a LUT index calculator 410 with the decoder 200 in the baseband circuit 302D. The decoder 200 uses the primary information 202 to determine the processed information 204, and then the LUT index calculator 410 uses the processed information 204 to determine a pointer or index value 412, which points to an entry in the LUT 404. The pointer or index value 412 is passed to a front-end module 414 through the bus 310. At the front-end module 414, the control circuit 316 may use the index value 412 with the LUT 404 to access an entry within the LUT 404 to get the settings and load them into the register(s) 406 so that the transmission chain 312 and receive chain 314 may be adjusted. The index value 412 is relatively short (especially as compared to the signal 402), and thus, the communication across the bus 310 is relatively short.

As still another variation, the LUT may be moved to the baseband circuit 302E within transceiver system 400C as illustrated in FIG. 4C. More specifically, the baseband circuit 302E takes the primary information 202 and provides it to a decoder 200, which may use an LUT index calculator 410 to determine a location in a LUT 420 where the settings are stored. The baseband circuit 302E then passes the settings 418 over the bus 310 to be written into the register(s) 406 of the front-end module 422.

FIGS. 3A-4C assume relatively easy communication between the baseband circuit and the front-end module. It should be appreciated that the communication may be embedded in the RFFE signals, part of a sideband bus, or the like. Likewise, the communication may be controlled by firmware of the device that includes the transceiver system (e.g., a smartphone or mobile computing device). There are a variety of pieces of primary information 202 and processed information 204 that are relevant. It should be appreciated that the more pieces of primary information 202 or processed information 204 used, the larger the LUT is and potentially the larger the signal passing between the baseband circuit and the front-end module is. Such increases in size may consume more power and thus it may be a better design choice to limit the primary information 202 to those parameters that have a significant impact on the linearity of the front-end module. For example, sometimes merely knowing what cellular generation is being used (2G, 3G, 4G, or 5G) may be sufficient to know which register settings to use. That is, if the cellular generation is 2G, the bandwidth is relatively narrow and the PAR is relatively low, so few changes are needed. 4G and 5G have much higher bandwidths, and a variety of possible PAR, so more settings may be used during optimization. It should be appreciated that given four cellular generations, the generation may be transmitted with just two bits.

Setting aside the ability to reduce information, and without limitation, some of the primary information 202 may include bias settings for the driver amplifier stage, bias information for the power amplifier stage, the Vcc supply bias, Vcc settings, PMIC mode (ET, APT, or the like), co-existence tables including the filter tuning, and LNA settings. Each of these types of information may have a setting or index for the processed information 204, which may include modulation generation, modulation bandwidth, modulation PAR/MPR, operating band, operating sub-band, power mode (e.g., high, medium, low), Vcc Supply voltage set by PMIC, and operating frequency. As noted, additional parameters may be added, but will result in a power use increase based on the additional memory requirements.

Another option to reduce memory size is using a digital-to-analog converter (DAC) (not shown) in the signal path. The DAC may convert the modulation information as needed. In still another aspect, an interpolation algorithm may be used to interpolate values between values provided in the LUT. In yet another aspect, a micro-controller may be used to drive the entire front-end module register settings. Such a micro-controller may allow implementation of calibration algorithms, built-in test and real-time adjustment schemes. It should further be appreciated that the LUT may include "pages" dedicated to different types of information. Thus, one page could be for modulation generation (e.g., 4G, 5G), another page for PAR/MPR, and another page for sub-bands. Still other organizational structures for the LUT may be used without departing from the present disclosure.

Figure 5:
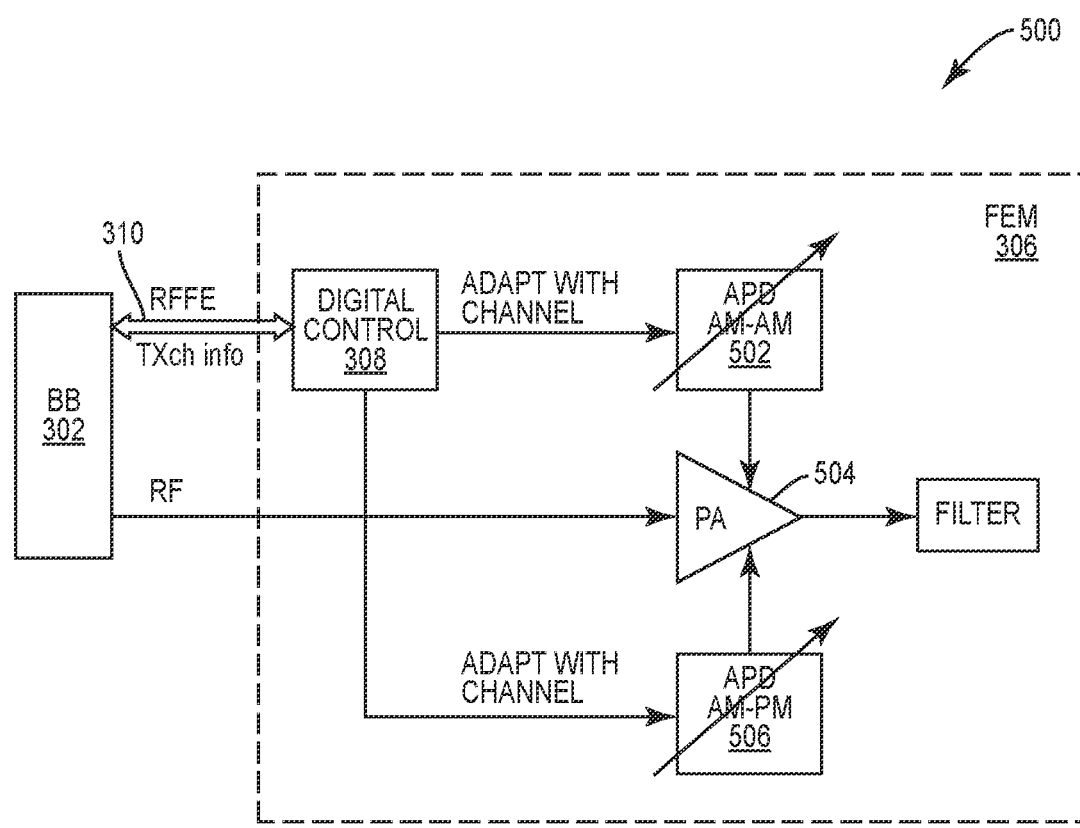
FIG. 5 is a block diagram of a transceiver illustrating how analog predistortion (APD) may be applied based on information from the baseband circuit.

As noted, once the registers of the front-end module are programmed with desired changes, the control circuit within the front-end module may apply the values within the registers to operating parameter settings. In exemplary aspects of the present disclosure, these changes may be made to bias applied to power amplifier stages, matching circuitry, and/or to loads at an output of an output power amplifier stage. Further, as illustrated in FIG. 5, APD circuitry may be used to change amplitude modulation-to-amplitude modulation (AM-AM) distortion and/or amplitude modulation-to-phase modulation (AM-PM) distortion in the transceiver. More specifically, a transceiver 500 may include a first APD circuit 502 which operates to control AM-AM predistortion for a power amplifier 504 and a second APD circuit 506, which operates to control AM-PM predistortion for the power amplifier 504.

Figure 6:
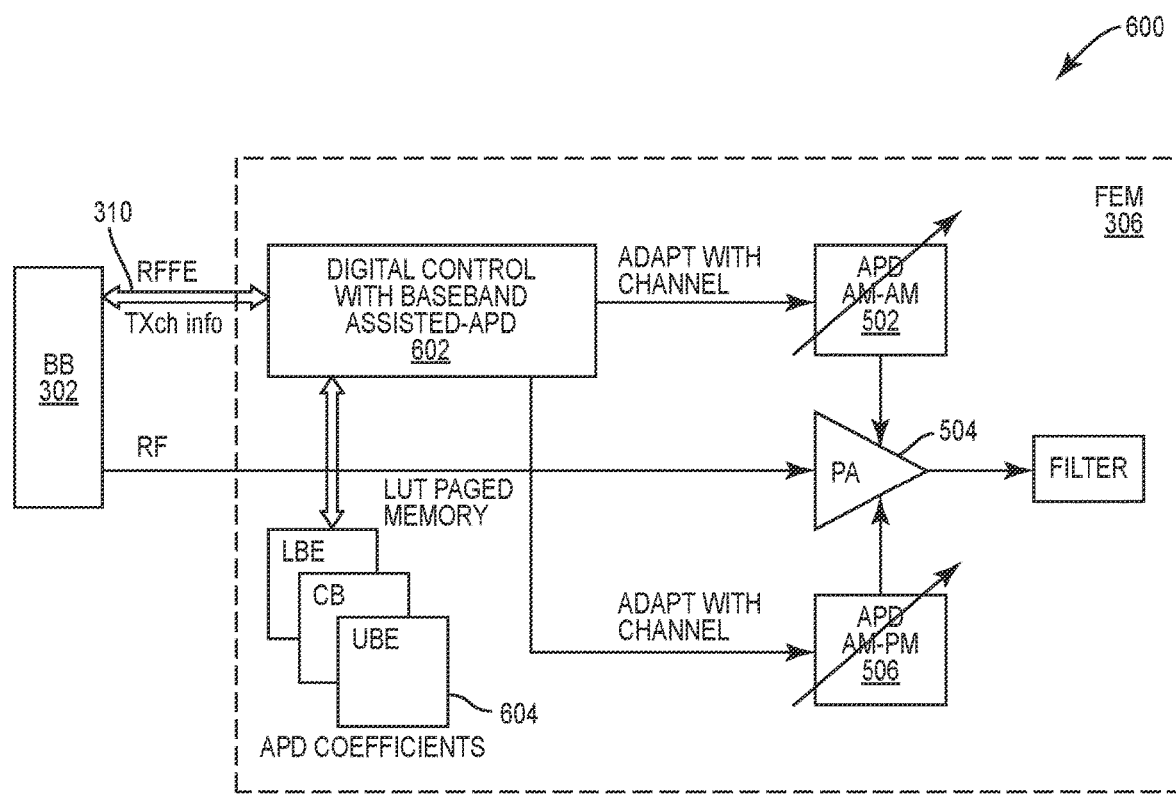
FIG. 6 is a more detailed block diagram of the transceiver of FIG. 5 with channel information stored in a look-up table (LUT)

FIG. 6 illustrates a similar transceiver 600 where a control circuit 602 uses a LUT 604 to program the APD coefficients for the APD circuits 502, 504. Note that as described above, the values or pages in the LUT 604 may be based on any of the parameters previously identified. If sub-banding information is provided, different coefficients may be provided for different sub-bands.

Figure 7:
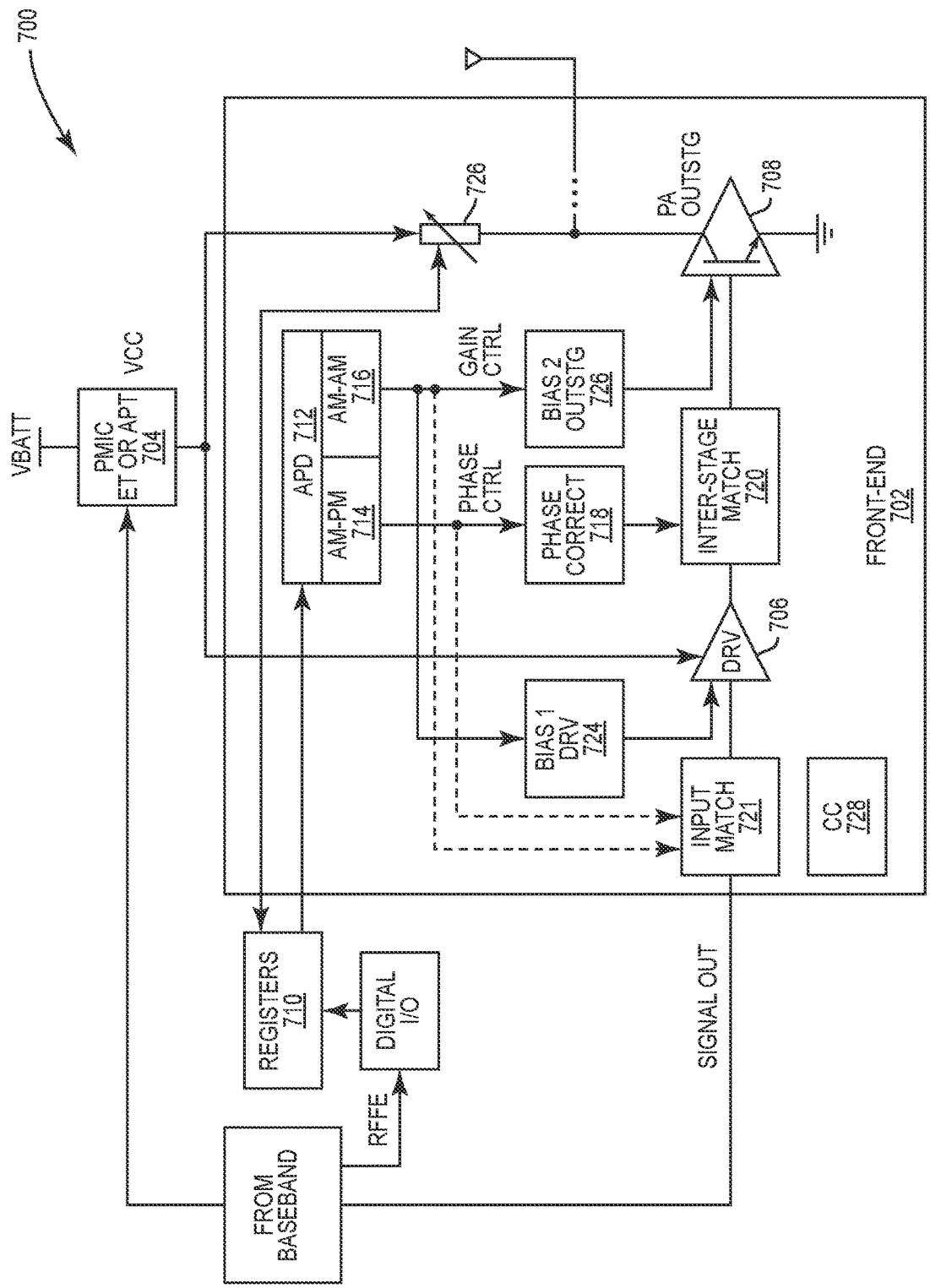
FIG. 7 is a block diagram of a transceiver system showing where changes in operating parameter settings may be made after receiving information from the baseband circuit.

FIG. 7 provides a block diagram of a transceiver system 700 showing where changes in operating parameter settings may be made given that a front-end module 702 has received information (in whatever format) from a baseband circuit (not shown). In particular, a PMIC 704—that may include ET or APT control circuitry based on information from the baseband circuit—may provide a Vcc signal to a driver power amplifier stage 706 and/or an output power amplifier stage 708 (note that the Vcc signal may be shared or distinct as needed or desired without departing from the present disclosure). This Vcc signal may be adjusted based on the information from the baseband circuit according to information in a register(s) 710. Settings in the register(s) 710 may also be passed to an APD circuit 712, which may include an AM-PM circuit 714 and/or an AM-AM circuit 716. Signals from the AM-PM circuit 714 are provided to a phase correction circuit 718, which in turn is coupled to an interstage matching circuit 720 and/or an input matching circuit 721. Signals from the AM-AM circuit 716 may be provided to bias circuits 724, 726 which provide bias signals to the driver power amplifier stage 706 and output power amplifier stage 708, respectively. Optionally, the signal from the AM-AM circuit 716 may be provided to the input matching circuit 721, although such adjustments may be redundant.

In addition to changing the bias for the power amplifier stages 706, 708 and adjusting the matching circuits 720, 721, exemplary aspects of the present disclosure may also adjust a load 726. A control circuit 728 may cause values from the register(s) 710 to be used as intended by the various elements. As discussed above, not every element that can be adjusted has to be adjusted for optimization. Changes may be made to the operating parameter settings having the most impact while ignoring those parameters that have small or redundant impact.

More detail about the APD circuit 712 may be found in related provisional patent applications 63/267,553, filed Feb. 4, 2022 and 63/267,633, filed Feb. 7, 2022, both of which are hereby incorporated by reference in their entireties. The '553 application and the '633 application use standalone APD circuits to make adjustments without the benefit of information from the baseband circuit. Exemplary aspects of the present disclosure allow the APD to make adjustments with the benefit of the information from the baseband circuit.

Figure 8:
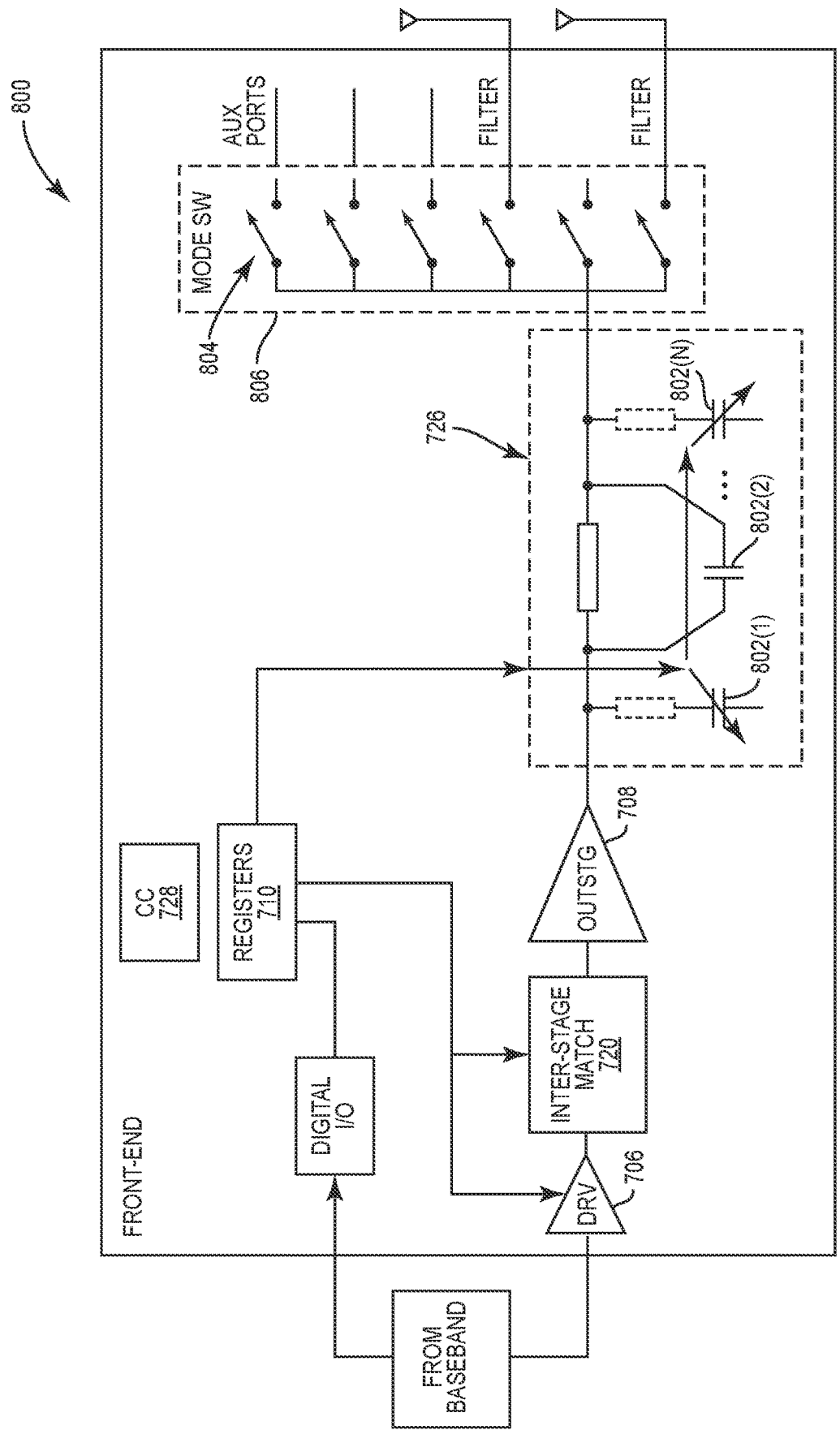
FIG. 8 is a block diagram of a transceiver system showing a possible load operating parameter setting being changed as a function of information from the baseband circuit.

FIG. 8 provides additional detail about a possible implementation of a variable load 726 that may be adjusted based on information in the registers 710. Specifically, FIG. 8 shows a transceiver system 800 that has the load 726. More specifically, the load 726 may include variable capacitors 802(1)-802(N) which may be embedded in DACs or controlled by DACs to adjust an overall impedance of the load 726. Still other implementation may be used. In an exemplary aspect, different ones of the variable capacitors 802(1)-802(N) may be switched on or off (or have a capacitive value changed) based on a modulation generation (e.g., 4G or 5G) along with switches 804 in a switch array 806.

The above discussion has tended to treat the operating band as a monolithic entity. However, it should be appreciated that current may fluctuate dramatically (e.g., in excess of 80-100 milliamps (mA)) over the bandwidth of a given channel. Exemplary aspects of the present disclosure contemplate providing information about operating sub-bands from the baseband circuit to the front-end module so that the front-end module may make adjustments to operating parameter settings to improve linearity. As discussed above, the changes may be made in the PMIC, the matching circuits, the power amplifier stages, and/or the load.

Figure 9:
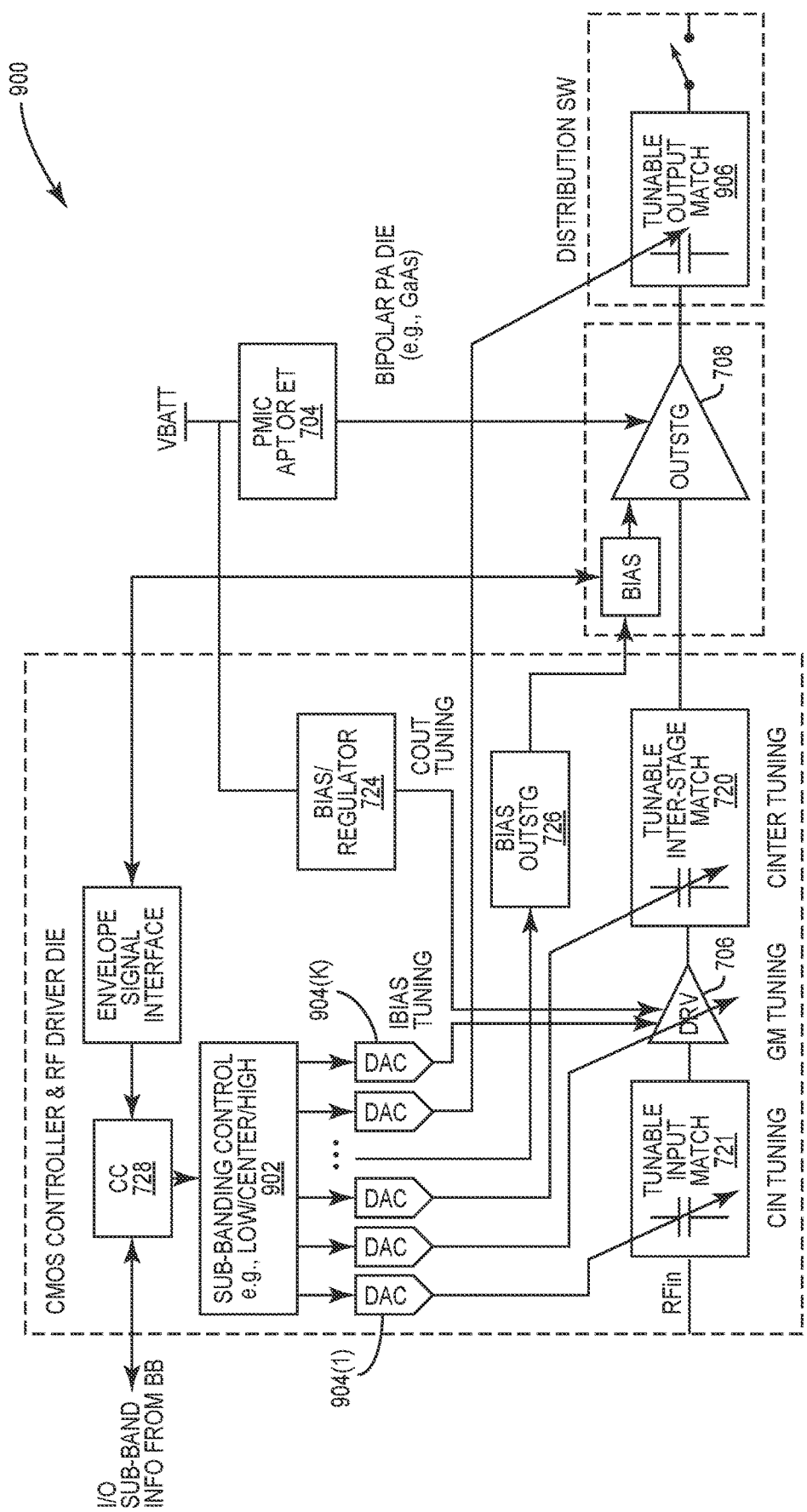
FIG. 9 is a block diagram of a transceiver system highlighting how sub-banding information may be used in the front-end module to adjust operating parameter settings according to exemplary aspects of the present disclosure.

In this regard, FIG. 9 illustrates a transceiver system 900 that shares many of the same attributes of the earlier transceiver systems, but may also include a sub-band control 902, which may be part of the control circuit 316, or may be a separate circuit. The sub-band control 702 may use DACs 904(1)-904(K) to adjust operating parameter settings of matching circuits 720, 721, 706, power amplifier stages 706, 708, bias circuits 724, 726, PMIC 704, or the like. Narrow band channels may have no sub-bands, but medium bandwidth channels may have two or more sub-bands. Wideband and ultra wideband channels may have four or more sub-bands.

While there are numerous ways to format a signal used to convey the information to the front-end module, one possible way is in two-bit groups as set forth in Table 1.

TABLE 1

| Example information signal | | | | | |
|---|---|---|---|---|---|
| Modulation Generation | PAR | MRPR | BW | Channel | Sub-band |
| 2 bits | 2 bits | 2 bits | 2 bits | 2 bits | 2 bits |

It should be appreciated that other formats may also be used (e.g., a pointer may only have 4 bits for example.

While the discussion above has focused on the flow of information from the baseband circuit to the front-end module, it should be appreciated that there may be instances where the front-end module provides information to the baseband circuit. Such information may include flags where operation has caused a power amplifier stage to enter an over-power/over-voltage/over-current type situation, or the like.

It is also noted that the operational steps described in any of the exemplary aspects herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary aspects may be combined. It is to be understood that the operational steps illustrated in the flowchart diagrams may be subject to numerous different modifications as will be readily apparent to one of skill in the art. Those of skill in the art will also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations. Thus, the disclosure is not intended to be limited to the examples and designs described herein but is to be accorded the widest scope consistent with the principles and novel features disclosed herein.

What is claimed is:

1. An integrated circuit (IC) comprising a front-end module for use in a transceiver system, the front-end module comprising:
   a bus interface configured to be coupled to a baseband circuit through a communication bus;
   at least one register within the IC, the at least one register configured to store operating parameter settings based on information from the baseband circuit;
   an operating element within the IC, the operating element configured to act on a signal to be transmitted; and
   a control circuit within the IC, the control circuit configured to adjust the operating element based on the operating parameter settings in the at least one register.

2. The IC of claim 1, wherein the operating element comprises a power management integrated circuit.

3. The IC of claim 1, wherein the operating element comprises a load coupled to an output of the front-end module.

4. The IC of claim 1, wherein the operating element comprises an analog predistortion (APD) circuit.

5. The IC of claim 4, wherein the APD circuit comprises an amplitude modulation-to-amplitude modulation (AM-AM) circuit.

6. The IC of claim 4, wherein the APD circuit comprises an amplitude modulation-to-phase modulation (AM-PM) circuit.

7. The IC of claim 1, wherein the operating element comprises a power amplifier stage.

8. The IC of claim 1, wherein the operating element comprises a bias circuit for a power amplifier stage.

9. The IC of claim 1, wherein the operating element comprises a matching circuit.

10. The IC of claim 1, further comprising a decoder configured to receive primary information from the baseband circuit through the bus interface and produce processed information therefrom.

11. The IC of claim 1, further comprising a look-up table (LUT) configured to use the information from the baseband circuit to determine the operating parameter settings.

12. The IC of claim 11, wherein the information from the baseband circuit comprises an index pointer configured to point to an entry in the LUT.

13. The IC of claim 1, wherein the information from the baseband circuit is derived in a software layer associated with the baseband circuit.

14. The IC of claim 1, wherein the information from the baseband circuit comprises processed information.

15. The IC of claim 1, wherein the information from the baseband circuit comprises information regarding a modulation generation.

16. The IC of claim 1, wherein the information from the baseband circuit comprises information regarding a baseband channel.

17. The IC of claim 16, wherein the information regarding the baseband channel comprises information regarding a sub-band.

18. The IC of claim 1, wherein the information from the baseband circuit comprises information regarding a peak-to-average ratio (PAR).

19. The IC of claim 1, wherein the information from the baseband circuit comprises information regarding a modulation type.

20. The IC of claim 1, wherein the information from the baseband circuit comprises information regarding carrier aggregation.

21. The IC of claim 1, wherein the information from the baseband circuit comprises information regarding a modulation power reduction (MPR) value.

22. The IC of claim 1, further comprising a receive chain and wherein the information from the baseband circuit is further used by the receive chain to modify the operating parameter settings.

23. A transceiver system comprising: a baseband circuit; a communication bus coupled to the baseband circuit; and a front-end module comprising: a bus interface coupled to the communication bus; at least one register configured to store operating parameter settings based on information from the baseband circuit;
   an operating element that acts on a signal to be transmitted; and
   a control circuit that adjusts the operating element based on the operating parameter settings in the at least one register.

24. The transceiver system of claim 23, wherein the baseband circuit is configured to provide information regarding a transmit channel as part of the information.

25. The transceiver system of claim 24, wherein the information regarding the transmit channel comprises information regarding a position of the transmit channel.

26. The transceiver system of claim 23, wherein the baseband circuit is configured to provide information regarding a receive channel as part of the information.

27. The transceiver system of claim 26, further comprising a low noise amplifier (LNA) in a receive path, and wherein the information regarding the receive channel is used by the control circuit to change operation of the LNA.

28. The transceiver system of claim 23, further comprising a power management circuit and wherein the baseband circuit is configured to provide the information to the power management circuit.

29. The transceiver system of claim 28, wherein the information comprises information regarding a sub-band.

30. The transceiver system of claim 23, wherein the operating element comprises a load line and the control circuit is configured to adjust the load line as a function of sub-band information in the information.

* * * * *